US010805838B2

(12) United States Patent
Qu et al.

(10) Patent No.: US 10,805,838 B2
(45) Date of Patent: Oct. 13, 2020

(54) METHOD AND DEVICE FOR OBTAINING RESOURCES AND INFORMATION OF SDN NETWORKS OF DIFFERENT OPERATORS (71) Applicant: Nokia Solutions and Networks Oy, Espoo (FI)

(72) Inventors: Xin Qu, Shanghai (CN); Yigang Cai, Naperville, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/348,539

(22) PCT Filed: Dec. 5, 2017

(86) PCT No.: PCT/EP2017/081461
§ 371 (c)(1),
(2) Date: May 9, 2019

(87) PCT Pub. No.: WO2018/104273
PCT Pub. Date: Jun. 14, 2018

(65) Prior Publication Data
US 2019/0364461 A1 Nov. 28, 2019

(30) Foreign Application Priority Data
Dec. 9, 2016 (CN) .......................... 2016 1 1132497

(51) Int. Cl.
H04W 28/16 (2009.01)
H04L 12/14 (2006.01)
(Continued)

(52) U.S. Cl.
CPC ......... *H04W 28/16* (2013.01); *H04L 12/1446* (2013.01); *H04L 41/042* (2013.01);
(Continued)

(58) Field of Classification Search
None
See application file for complete search history.

(56) References Cited

U.S. PATENT DOCUMENTS

2016/0174055 A1 6/2016 Wang et al.
2017/0055183 A1* 2/2017 Park .................. H04W 36/0033
(Continued)

FOREIGN PATENT DOCUMENTS

EP       3 142 303 A1   3/2017
WO   WO 2015/180154 A1   12/2015

OTHER PUBLICATIONS

Open Networking Foundation (ONF) "SDN architecture", © 2014 Open Networking Foundation, 68 pgs.

*Primary Examiner* — James A Edwards
(74) *Attorney, Agent, or Firm* — Harrington & Smith (57) ABSTRACT Embodiments of the present disclosure relate to a method for obtaining information and resources of SDN networks of different operators and a corresponding device. The method includes UE of the first operator transmits a resource request to an SDN controller of the first operator. Afterwards, the SDN controller of the first operator transmits a resource request to an SDN controller of the second operator via an interface newly introduced by the present invention, obtains information of the SDN network of the second operator and utilizes resources of the SDN network of the second operator based on the information. The present invention also discloses a device capable of implementing the above method.

14 Claims, 5 Drawing Sheets (51) Int. Cl.
  *H04L 12/24* (2006.01)
  *H04W 16/14* (2009.01)
  *H04W 28/08* (2009.01)
  *H04W 4/24* (2018.01)

(52) U.S. Cl.
  CPC .......... *H04W 16/14* (2013.01); *H04W 28/08* (2013.01); *H04W 4/24* (2013.01)

(56) References Cited

U.S. PATENT DOCUMENTS

2017/0099658 A1* 4/2017 Shattil .................... H04B 7/024
2018/0013684 A1* 1/2018 Liu ......................... H04L 67/16

\* cited by examiner

METHOD AND DEVICE FOR OBTAINING RESOURCES AND INFORMATION OF SDN NETWORKS OF DIFFERENT OPERATORS

CROSS REFERENCE TO RELATED APPLICATION

This patent application is a U.S. National Stage application of International Patent Application Number PCT/EP2017/081461 filed Dec. 5, 2017, which is hereby incorporated by reference in its entirety, and claims priority to CN 201611132497.8 filed Dec. 9, 2016.

FIELD

Embodiments of the present disclosure generally relate to communication technologies, and more specifically, to a method for utilizing SDN network resources and a corresponding device.

BACKGROUND

SDN (Software Defined Network) is a new network innovational architecture proposed by Stanford University, which is divided into an application layer, a control layer and an infrastructure layer. The core concept of SDN is separating the control plane of the network device from the data plane. The control plane of the network device is integrated into the SDN controller and the network device only keeps the data plane (such as forwarding entries). unified Unified network deployment and network automation are implemented by the SDN controller, thereby achieving flexible control of network flow and enabling the network to be more intelligent as pipelines.

The SDN controller collectively manages all devices in the SDN network, which flexibly and dynamically configures the network resources based on different demands and the global network topology. In another aspect, the SDN controller can configure the underlying network node, SDN Enabler. For example, the SDN controller issues forwarding tables to the underlying network node, such that the underlying network node routes traffic between the terminal device and the application server based on the determined traffic path. The underlying network node is also known as infrastructure network nodes or service entities, which can communicate with the SDN controller via a standard interface (such as OpenFlow protocol) and is configured to execute protocol conversion, data processing, traffic forwarding, device state collecting and the like among the specific operations. For example, the underlying network node can include a cache server, a switch, a firewall and the like. Accordingly, the SDN controller plays an extremely vital role in the SDN network.

Because the existing SDN network is still in an immature phase and lacks a unified technical specification, each operator is building its own SDN network. With accelerating SDN network deployment, the current situation that each operator is working in its own way cannot satisfy future requirements. For example, operator A and operator B deploy their own SDN network A and SDN network B, respectively. When the network A is congested or the usage fee of network A is higher than that of network B, the network B is in an idle state or even free of charge. In the existing solution, users in the network A cannot utilize resources of the network B. Since the users in the network A cannot obtain the network state of the network B, the network A and the network B cannot negotiate with each other in terms of utilizing resources of the other party, let alone billing the action of utilizing resources of the other party.

Therefore, the existing SDN solution cannot implement resources and information sharing among different operators.

SUMMARY

In general, the present disclosure provides a method for obtaining information and resources of SDN network of different operators and a corresponding device.

In a first aspect, the present invention provides a method implemented in an SDN controller of a first operator for assisting a UE to obtain resources and information from a second operator, comprising: receiving from a first UE a resource request, including information related to resources that are requested by the first UE, the first UE belonging to the first operator; transmitting to an SDN controller of the second operator the resource request including the information related to the resources that are requested by the first UE; receiving, from the SDN controller of the second operator, a reply to the resource request including information related to resources that are available to be provided by the second operator; and transmitting, to the first UE, the reply to the resource request including the information related to the resources that are available to be provided by the second operator.

In some embodiments, the method further comprises: receiving, from the first UE, a request for resources release, the request for resources release including information related to resources of the second operator that are requested by the first UE for release, the first UE belonging to the first operator; and transmitting, to the SDN controller of the second operator, the request for resources release, the request for resources release including the information related to the resources of the second operator that are requested by the first UE for release.

In some embodiments, the method further comprises: in response to the information related to the resources that are available to be provided by the second operator indicating a period of validity time for the resources that are available to be provided, storing, within the period of validity, the information related to the resources that are available to be provided by the second operator; and in response to receiving, within the period of validity, a resource request from a second UE belonging to the first operator and the resource request including the information related to resources that are requested by the second UE, transmitting, to the second UE, a reply to the resource request if the resources requested by the second UE are determined according to a predefined rule as being similar to the resources requested by the first UE, the reply to the resource request including the stored information related to the resources that are available to be provided by the second operator.

In some embodiments, the method further comprises: receiving from the SDN controller of the second operator, a billing request including information related to resources of the second operator that are utilized by the first UE; transmitting, to a billing module of the first operator, the billing request including information related to the resources of the second operator that are utilized by the first UE; receiving, from the billing module of the first operator, a reply to the billing request including the billing information for the resources of the second operator that are utilized by the first UE; and transmitting, to the SDN controller of the second operator, the reply to the billing request including the billing information for the resources of the second operator that are utilized by the first UE.

In a second aspect, the invention provides a method implemented in an SDN controller of a second operator for assisting a UE in obtaining resources and information from the second operator, the UE belonging to a first operator and the method comprises: receiving, from an SDN controller of the first operator, a resource request including information related to the resources that are requested by the UE; and transmitting, to the SDN controller of the first operator, a reply to the resource request, including information related to resources that are available to be provided by the second operator.

In some embodiments, the method further comprises: receiving, from the SDN controller of the first operator, a request for resources release, including information related to resources of the second operator that are requested by the UE for release; and releasing corresponding resources based on the related information.

In some embodiments, the method further comprises: transmitting, to the SDN controller of the first operator, a billing request including information related to resources of the second operator that are utilized by the UE; and receiving, from the SDN controller of the first operator, a reply to the billing request including billing information for the resources of the second operator that are utilized by the UE.

In a third aspect, the invention provides a method implemented in a UE of a first operator for obtaining resources and information of a second operator, comprising: transmitting to an SDN controller of the first operator a resource request including information related to resources that are requested by the first UE, the first UE belonging to the first operator; receiving, from the SDN controller of a first operator, a reply to the resource request including information related to resources that are available to be provided by the second operator; and utilizing resources of the second operator based on the information related to the resources that are available to be provided by the second operator.

In a fourth aspect, the invention provides an apparatus in an SDN controller of a first operator for assisting a UE in obtaining resources and information of a second operator, comprising: a first receiving module for receiving, from a first UE, a resource request including information related to resources that are requested by the first UE, the first UE belonging to the first operator; a first transmitting module for transmitting, to an SDN controller of the second operator, the resource request including information related to the resources that are requested by the first UE; a second receiving module for receiving, from the SDN controller of the second operator, a reply to the resource request including information related to resources that are available to be provided by the second operator; a second transmitting module for transmitting, to the first UE, the reply to the resource request including information related to the resources that are available to be provided by the second operator.

In some embodiments, the apparatus comprises: a third receiving module for receiving, from the first UE, a request for resources release, the request for resources release including information of resources related to a second operator that are requested by the first UE for release, the first UE belonging to the first operator; and a third transmitting module for transmitting, to the SDN controller of the second operator, a request for resources release, the request for resources release including information related to the resources of a second operator that are requested by the first UE for release.

In some embodiments, the apparatus comprises: a fourth receiving module for receiving, from the SDN controller of the second operator, a billing request, the billing request including information related to resources of the second operator that are utilized by the first UE; a fourth transmitting module for transmitting, to a billing module of the first operator, the billing request, the billing request including information related to resources of the second operator that are utilized by the first UE; a fifth receiving module for receiving, from the billing module of the first operator, a reply to the billing request, the reply to the biling request including billing information for the resources of the second operator that are utilized by the first UE; and a fifth transmitting module for transmitting, to the SDN controller of the second operator, the reply to the billing request, the reply to the billing request including billing information for the resources of the second operator that are utilized by the first UE.

In a fifth aspect, it is provided an apparatus in a SDN controller of a second operator for assisting a UE in obtaining resources and information from the second operator the UE belonging to a first operator and the apparatus comprises: a sixth receiving module for receiving, from an SDN controller of the first operator, a resource request, the resource request including information of resources that are requested by the UE; and a sixth transmitting module for transmitting, to the SDN controller of the first operator, a reply to the resource request, the reply to the resource request including information related to resources that are available to be provided by the second operator.

In some embodiments, the apparatus comprises: a seventh receiving module for receiving, from the SDN controller of the first operator, a request for resources release, the request for resource release including information related to resources of a second operator that are requested by the UE for release; a resources release module for releasing corresponding resources based on the related information.

In some embodiments, the apparatus comprises: an eighth transmitting module for transmitting, to the SDN controller of the first operator, a billing request, the billing request including information related to the resources of the second operator that are utilized by the UE; and an eighth receiving module for receiving, from the SDN controller of the first operator, a reply to the billing request, the reply to the billing request including billing information for the resources of the second operator that are utilized by the UE.

In a sixth aspect, there is provided an apparatus, in a UE of a first operator, for obtaining resources and information of a second operator, comprising: a ninth transmitting module for transmitting to, an SDN controller of the first operator, a resource request, the resource request including information related to resources that are requested by the first UE, the first UE belonging to the first operator; a ninth receiving module for receiving, from the SDN controller of the first operator, a reply to the resource request, the reply to the resource request including information related to resources that are available to be provided by the second operator; a resources utilizing module utilizing resources of the second operator based on related information of resources that are available to be provided by the second operator.

The present disclosure introduces a new interface between SDN controllers of different operators. The SDN controllers can obtain network state information of other operators via this interface, such that the UE can utilize network resources of other operators, thereby achieving resources and information sharing between different operators. Therefore, it not only improves the satisfaction degree of user experience, but also more efficiently utilizes the network resources. For example, the network resources are shared in a densely-populated area or in case of an emergency, so as to achieve optimization and fair use of the network resources.

It should be appreciated that the contents described in this Summary are not intended to identify key or essential features of embodiments of the present disclosure, or limit the scope of the present disclosure. Other features of the present disclosure will be understood more easily through the following description.

BRIEF DESCRIPTION OF THE DRAWINGS

Through the following detailed description with reference to the accompanying drawings, the above and other features, advantages and aspects of every embodiment of the present disclosure will become more apparent. In the drawings, the same or similar reference signs indicate the same or similar elements, wherein.

In all drawings, same or similar reference numbers indicate the same or similar elements.

DETAILED DESCRIPTION OF EMBODIMENTS

Embodiments of the present disclosure will be described in more details with reference to the drawings. Although the drawings illustrate some embodiments of the present disclosure, it should be appreciated that the present disclosure can be implemented in various manners and should not be limited to embodiments explained herein. On the contrary, embodiments are provided to understand the present disclosure in a more thorough and complete way. It should be appreciated that drawings and embodiments of the present disclosure are only for example purposes rather than restricting the protection scope of the present disclosure.

As used herein, the term "terminal device" or "user equipment" (UE) can include a variety of information sensing devices (also known as IoT devices), such as a radio frequency identification apparatus, infrared sensor, global positioning system and laser scanner and the like. The "terminal device" or "user equipment" (UE) can also include any terminal devices that can wirelessly communicate with the base stations or with each other, for example, a mobile terminal (MT), a subscriber station (SS), a portable subscriber station (PSS), a mobile station (MS) or an access terminal (AT), the above devices mounted on vehicles, MTC devices and the like. In the context of the present disclosure, the terms "terminal device" and "user equipment" can be used interchangeably for the sake of discussion.

The term "include" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least a further embodiment." Definitions related to other terms will be described in the following description.

As described above, because some information cannot be shared between the SDN networks of different operators, the users cannot utilize resources of SDN networks from other operators, which fails to achieve fair use and optimization of SDN network resources.

To at least partially solve these and other potential problems, embodiments of the present disclosure provide a method for obtaining resources and information of SDN networks of different operators.

Figure 1:
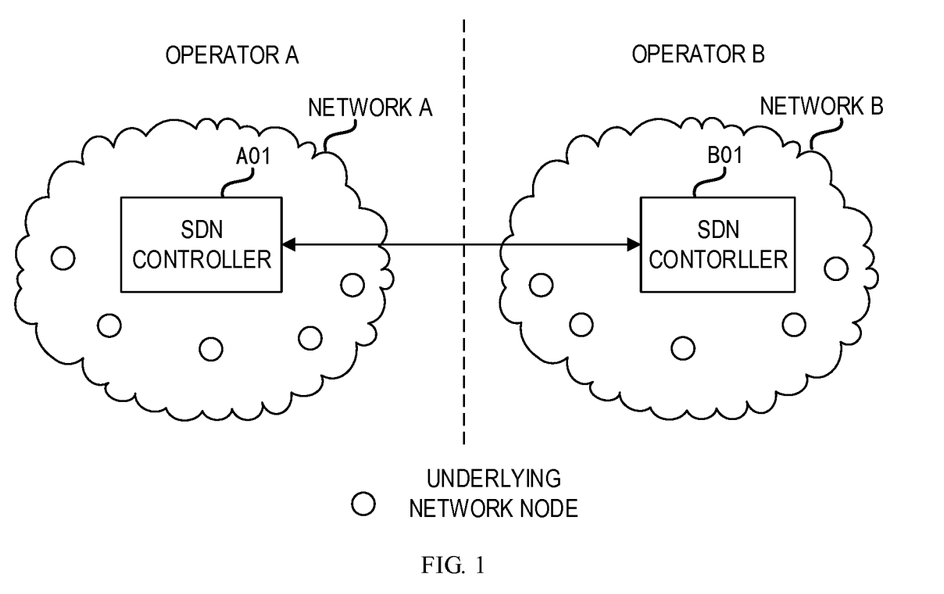
FIG. 1 illustrates an application scenario graph according to one embodiment of the present invention.

FIG. 1 illustrates an application scenario graph according to one embodiment of the present invention. In this embodiment, the SDN network A belongs to the operator A and the SDN network B belongs to the operator B. Network elements in the SDN network A include an SDN controller A01 and some underlying network nodes, and network elements in the SDN network B include an SDN controller B01 and some underlying network nodes. As shown in FIG. 1, the present disclosure introduces a new interface between the SDN controller A01 of the operator A and the SDN controller B01 of the operator B. The SDN controller can obtain some information of networks of other operators via this interface.

It should be understood that the type and the number of devices and/or elements shown in FIG. 1 are only for the purpose of explanation, rather than being restrictive. The application scenario normally also includes other necessary network elements and network connections, which are not shown in FIG. 1 for the sake of simplification.

Principles and detailed embodiments of the present disclosure will be described in details with reference to FIGS. 2 and 4.

Figure 2:
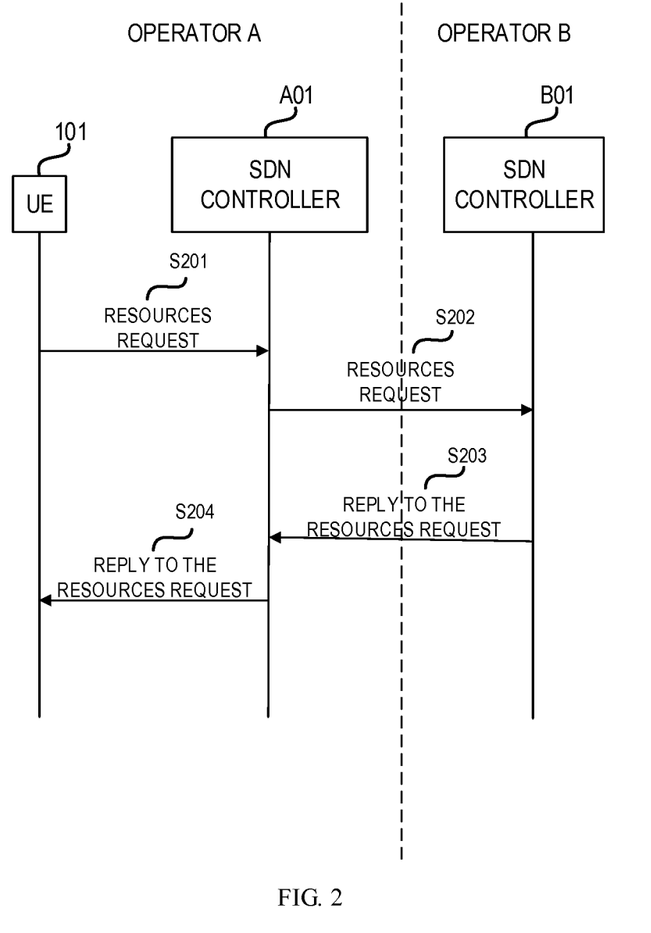
FIG. 2 illustrates a schematic diagram of a process of obtaining resources of SDN networks according to one embodiment of the present invention.
Figure 3:
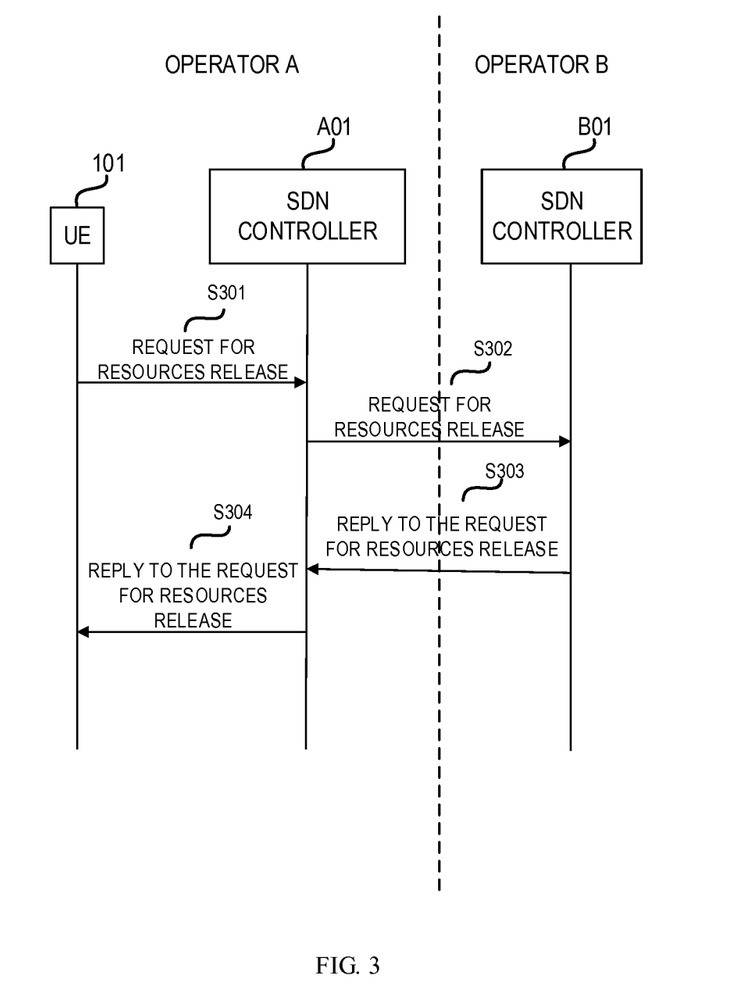
FIG. 3 illustrates a schematic diagram of a process of obtaining resources of SDN networks according to a further embodiment of the present invention.

FIG. 2 illustrates a schematic diagram of a process of utilizing resources of SDN networks according to one embodiment of the present invention. In this embodiment, UE101 belongs to the operator A.

The process starts from step S201.

At step S201, UE101 detects that the resources in the network A cannot satisfy its needs and sends a resource request to the SDN controller A01. The scenario that the resources in the network A cannot satisfy the needs of UE101 can be: insufficient resources of the network A (such as network congestion and the like), or the UE101 being unable to find resources that meet its needs in network A, or the UE101 considering that charges in network A are too high.

The resource request includes information related to the resources requested by the UE101, namely; the resource request specifies what kind of resources is desired by the UE101. In some embodiments, the resource request can include one or more of the following information items:

an identification of the UE 101;

a type of resources requested by the UE101, and the type can be audio, video, pictures, fax and the like;

a bandwidth of resources requested by the UE101;
time limit of usage requested by the UE101, which indicates the time for using the resources;
charges acceptable for the UE101.

Those skilled in the art would understand that the above listed information items are only examples and should not be interpreted as limitations. The resource request sent to the SDN controller A01 by the UE101 can also include other information for explaining the resources requested by the UE101.

After receiving the resource request of the UE101, the SDN controller A01 determines that the network A cannot provide the resources and then requests networks of other operators for the resources.

As shown at step S202, the SDN controller A01 of the operator A transmits a resource request to the SDN controller B01 of the operator B via the interface newly introduced by the present disclosure, the resource request including information related to the resources requested by the UE101. The resource request can include information in the resource request sent to the SDN controller A01 by the UE101 as described above, other information determined by the SDN controller A01, and other information commonly determined by the SDN controller A01 and UE101. In some embodiments, these other information can be one or more of the information items below:
whether the SDN controller of the network B is available, namely, whether the SDN controller of the network B supports the method of the present disclosure;
whether the network B is available;
the time period for using the network B;
congestion status of the network B;
routing information of the network B, namely, the routing information of the network B accessed by the device in the network A;
routing priority, namely, the priority for UE utilizing the routers of the network B; if a certain UE expects to utilize routers of the network B preferentially, it can set a higher priority.

Those skilled in the art should understand that the above listed information items are only examples and should not be interpreted as limitations. The resource request sent to the SDN controller B01 by the SDN controller A01 can also include other information for explaining the resources requested by the UE101.

After receiving the resource request from the SDN controller A01 of the operator A, the SDN controller B01 of the operator B checks whether its own network B has the resources requested by the UE101. The SDN controller B01 can acquire related information from other network elements in the network B or determine the presence of the resources requested by UE101 based on its stored information.

Afterwards, at step S203, the SDN controller B01 of the operator B sends a reply to the resource request to the SDN controller A01 of the operator A via the interface newly introduced by the present invention, the reply to the resource request including information related to the resources that are available to be provided by the operator B. The SDN controller B01, based on its own network state and the related information of the resources requested by UE101, determines information related to the resources that are available to be provided by the network B, namely, what resources are available to be provided by the network B for the request of the UE101. In some embodiments, the reply to the resource request can include one or more of the following information items:
an identification of UE101;
a type of resources provided by the network B, and the type can be audio, video, pictures, fax etc.;
a bandwidth of resources provided by the network B;
time limit of usage of the resources provided by the network B;
charges of the resources provided by the network B;
connection information, such as accessing the network B from which underlying network node etc.

If the SDN controller B01 determines, based on its own network state, that the network B cannot provide resources requested by the UE101, the above reply to the resource request indicates that the network B cannot provide the resources requested by the UE101.

Those skilled in the art should understand that the above listed information items are only examples and should not be interpreted as limitations. The reply to the resource request sent to the SDN controller A01 by the SDN controller B01 can also include other related information for explaining the resources that are available to be provided by the operator B.

Next, at step S204, the SDN controller A01 sends a reply to the resource request to the UE101, which includes information related to the resources that are available to be provided by the operator B.

Then, UE101 utilizes corresponding resources of the operator B based on the related information of the resources that are available to be provided by the operator B. For example, if the above related information indicates that the operator B can provide the video resources requested by the UE101 and specifies IP addresses of connecting network elements, the UE101 can connect to the network B via the IP address and utilize resources of the network B.

In a further embodiment, if the information related to the resources that are available to be provided by the operator B, which is included in the reply to the resource request received by the SDN controller A01 from the SDN controller B01, indicates a period of validity time of the resources that are available to be provided by the operator B, the SDN controller A01 stores the above related information of the resources that are available to be provided by the operator B during the period of validity time, such that upon receiving the same or similar resource requests of other UEs, it can directly reply the above stored related information of the resources that are available to be provided by the operator B to other UEs, without inquiring the operator B of its network state.

During the above period of validity time, the SDN controller A01 receives the resource request from UE102 (not shown in the drawings). The UE102 belongs to the operator A and the resource request includes information related to the resources requested by the UE102. If the SDN controller A01 determines that the resource request of UE102 is identical to or similar to the above resource request of the UE101 according to the predefined rules, the SDN controller A01 can directly send a resource request reply to the UE102 without inquiring the operator B of its network state, the reply to the resource request including the above stored information related to the resources that are available to be provided by the operator B. The UE102 utilizes the corresponding resources of the operator B based on the information related to the resources that are available to be provided by the operator B.

It can be seen that the present disclosure introduces a new interface between the SDN controllers of different operators. UE can utilize SDN network resources of other operators via this interface.

FIG. 3 illustrates a schematic diagram of a process of utilizing resources of SDN networks according to a further embodiment of the present invention.

The process starts from step S301.

At step S301, after utilizing the resources of the network B, the UE101 sends a request for releasing resources to the SDN controller A01, which includes information related to the resources of the operator B requested by the UE101 for release.

Next, at step S302, the SDN controller A01 sends a request for releasing resources to the SDN controller B01 via the interface newly introduced by the present disclosure, the request for releasing resources including information related to the resources of the operator B requested by the UE101 for release. Upon receiving the message, the SDN controller B01 releases corresponding resources in the network B.

Afterwards, at the step S303, the SDN controller B01 sends a reply to the request for releasing resources to the SDN controller A01.

Then, in the step S304, the SDN controller A01 sends a reply to the request for releasing resources to the UE101.

Figure 4:
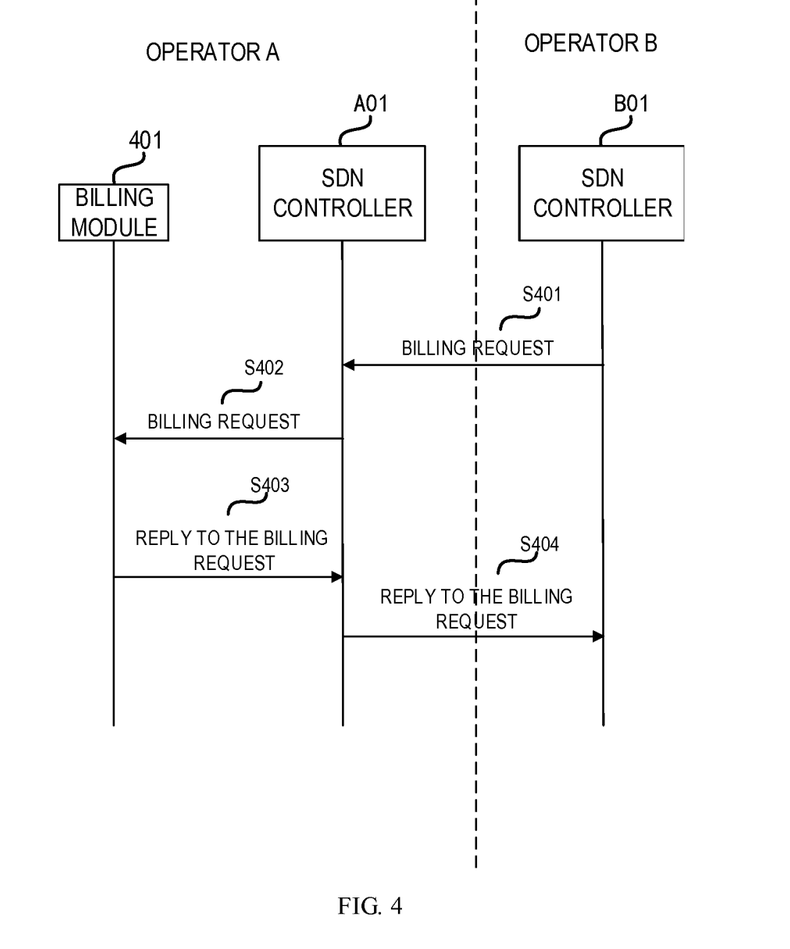
FIG. 4 illustrates a schematic diagram of a process of obtaining resources of SDN networks according to another embodiment of the present invention.

FIG. 4 illustrates a schematic diagram of a process of utilizing resources of SDN networks according to another embodiment of the present disclosure.

The process starts from step S401.

At the step S401, the SDN controller B01 sends a billing request to the SDN controller A01 via the interface newly introduced by the present disclosure, where the billing request includes information related to the resources of the operator B utilized by UE101, the information being used for indicating which resources of the operator B are utilized by UE101. In some embodiments, the billing request can include one or more of the following information items:
   an identification of the UE101;
   a type of resources utilized by the UE101, and the type can be audio, video, pictures, fax etc.;
   amount of resources utilized by the UE101 (such as traffic volume etc.);
   time limit for the UE101 to utilize the resources, which indicates the time for using the resources;
   charges of the resources utilized by the UE101.

Those skilled in the art can understand that the above listed information items are only examples and should not be interpreted as limitations. The billing request sent by the SDN controller B01 to the SDN controller A01 can also include other related information for explaining the resources of the operator B utilized by UE101.

Afterwards, at the step S402, the SDN controller A01 sends a billing request to a billing module 401 in the network A, which includes the above related information of the resources of the operator B utilized by UE101. The billing module 401 belongs to the operator A, which can be an online billing system, or an offline billing system. The billing module 401 charges the resources of the operator B utilized by UE101, which belongs to the prior art and will not be described here.

Next, at the step S403, the billing module 401 sends a reply to the billing request to the SDN controller A01, which includes billing information of the resources of the operator B utilized by the UE101.

Then, at the step S404, the SDN controller A01 sends a reply to the billing request to the SDN controller B01 via the interface newly introduced by the present disclosure, the reply to the billing request including billing information of the resources of the operator B utilized by the UE101.

Figure 5:
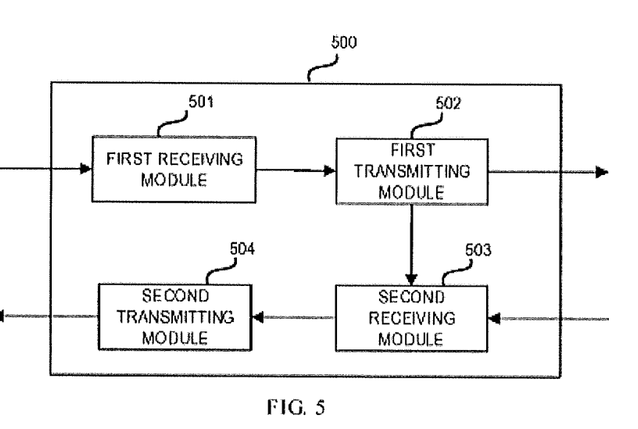
FIG. 5 illustrates a block diagram of an apparatus for obtaining resources and information of SDN networks in an SDN controller according to one embodiment of the present invention.

FIG. 5 illustrates a block diagram of an apparatus for assisting UE101 to obtain resources and information of SDN network B in the SDN controller A01 according to one embodiment of the present disclosure. The apparatus 500 includes: a first receiving module 501, a first transmitting module 502, a second receiving module 503 and the second transmitting module 504.

The operational process of the apparatus will be described in details with reference to FIGS. 1 to 4.

First, the first receiving module 501 receives a resource request from the UE101. If the UE101 detects that resources in network A cannot meet its requirements, the UE101 will send a resource request to the SDN controller A01. The scenario that the resources in the network A cannot satisfy the needs of UE101 can be: insufficient resources of the network A (such as network congestion and the like), or the UE101 being not able to find resources that meet its needs in network A, or UE101 considering that charges in network A are too high.

The resource request includes related information related to the resources requested by the UE101, namely, the resource request specifies what kind of resources is desired by the UE101. In some embodiments, the resource request can include one or more of the following information items:
   an identification of the UE101;
   a type of resources requested by the UE101, and the type can be audio, video, pictures, fax and the like;
   a bandwidth of resources requested by the UE101;
   time limit of usage requested by the UE101, which indicates the time for using the resources;
   charges acceptable for the UE101.

Those skilled in the art would understand that the above listed information items are only examples and should not be interpreted as limitations. The resource request sent to the SDN controller A01 by the UE101 can also include other information for explaining the resources requested by UE101.

After receiving the resource request of the UE101, the SDN controller A01 determines that the network A cannot provide the resources and then requests networks of other operators for the resources.

The first transmitting module 502 transmits a resource request to the SDN controller B01 of the operator B via the interface newly introduced by the present disclosure, the resource request including information related to the resources requested by UE101. The resource request can include information in the resource request sent to the SDN controller A01 by the UE101 as described above, other information determined by the SDN controller A01, and other information commonly determined by the SDN controller A01 and the UE101. In some embodiments, these other information can be one or more of the information items below:
whether the SDN controller of the network B is available, namely, whether the SDN controller of the network B supports the method of the present disclosure;
whether the network B is available;
the time period for using the network B;
congestion status of the network B;
routing information of the network B, namely, the routing information of the network B accessed by the device in the network A;
routing priority, namely, the priority for UE utilizing the routers of the network B; if a certain UE expects to utilize routers of the network B preferentially, it can set a higher priority.

Those skilled in the art should understand that the above listed information items are only examples and should not be interpreted as limitations. The resource request sent to the SDN controller B01 by the SDN controller A01 can also include other information for explaining the resources requested by the UE101.

Afterwards, the second receiving module 503 receives a reply the the resource request from the SDN controller B01 via the interface newly introduced by the present disclosure, the reply to the resource request including information related to the resources that are available to be provided by the operator B, namely, what resources are available to be provided by the network B for the request of the UE101. In some embodiments, the reply to the resource request can include one or more of the following information items:
- an identification of UE101;
- a type of resources provided by the network B, and the type can be audio, video, pictures, fax etc.;
- a bandwidth of resources provided by the network B;
- time limit of usage of the resources provided by the network B;
- charges of the resources provided by the network B;
- connection information, such as accessing the network B from which underlying network node etc.

If the SDN controller B01 determines, based on its own network state, that the network B cannot provide resources requested by the UE101, the above reply to the resource request indicates that the network B cannot provide the resources requested by the UE101.

Those skilled in the art should understand that the above listed information items are only examples and should not be interpreted as limitations. The reply to the resource request sent to the SDN controller A01 by the SDN controller B01 can also include other related information for explaining the resources that are available to be provided by the operator B.

Next, the second transmitting module 504 sends a reply to the resource request to the UE101, which includes information related to the resources that are available to be provided by the operator B.

In some embodiments, if the information related to the resources that are available to be provided by the operator B, which is included in the reply to the resource request received by the second receiving module 503 from the SDN controller B01, indicates a period of validity time of the resources that are available to be provided by the operator B, the SDN controller A01 stores the above related information of the resources that are available to be provided by the operator B during the period of validity time, such that upon receiving same or similar resource requests of other UEs, it can directly reply the above stored related information of the resources that are available to be provided by the operator B to other UEs, without inquiring the operator B of its network state.

During the above period of validity time, the first receiving module 501 also receives the resource request from UE102 (not shown in the drawings). The UE102 belongs to the operator A and the resource request includes information related to the resources requested by the UE102. If the SDN controller A01 determines that the resource request of UE102 is identical to or similar to the above resource request of the UE101 according to the predefined rules, the SDN controller A01 does not need to inquire the operator B of its network state. The second transmitting module 504 can also directly send the reply to the resource request to the UE102, which includes the above stored information related to the resources that are available to be provided by the operator B. The UE102 utilizes the corresponding resources of the operator B based on the information related to the resources that are available to be provided by the operator B.

In some other embodiments, the apparatus 500 also includes: a third receiving module (not shown in FIG. 5) and a third transmitting module (not shown in FIG. 5).

The third receiving module receives from UE101 a request for releasing resources, which includes related information of the resources of the operator B requested by the UE101 for release.

Next, the third transmitting module sends a request for releasing resources to the SDN controller B01 via the interface newly introduced by the present invention, wherein the request for releasing resources includes related information of the resources of the operator B requested by UE101 for release.

In some further embodiments, the apparatus 500 may also include: a fourth receiving module (not shown in FIG. 5) and a fourth transmitting module (not shown in FIG. 5); a fifth receiving module (not shown in FIG. 5) and a fifth transmitting module (not shown in FIG. 5).

The fourth receiving module receives a billing request from the SDN controller B01 via the interface newly introduced by the present disclosure, where the billing request includes information related to the resources of the operator B utilized by UE101, the information being used for indicating which resources of the operator B are utilized by UE101. In some embodiments, the billing request can include one or more of the following information items:
- an identification of UE101;
- a type of resources utilized by UE101, and the type can be audio, video, pictures, fax etc.;
- amount of resources utilized by UE101 (such as traffic volume etc.);
- time limit for the UE101 to utilize the resources, which indicates the time for using the resources;
- charges of the resources utilized by the UE101.

Those skilled in the art can understand that the above listed information items are only examples and should not be interpreted as limitations. The billing request sent by the SDN controller B01 to the SDN controller A01 can also include other related information for explaining the resources of the operator B utilized by UE101.

Afterwards, the fourth transmitting module sends a billing request to a billing module 401 in the network A, which includes the above related information of the resources of the operator B utilized by UE101. The billing module 401 belongs to the operator A, which can be an online billing system, or an offline billing system. The billing module 401 charges the resources of the operator B utilized by UE101, which belongs to the prior art and will not be described here.

Next, the fifth receiving module receives a reply to the billing request from the billing module 401, which includes billing information of the resources of the operator B utilized by UE101.

Then, the fifth transmitting module sends a reply to billing request to the SDN controller B01 via the interface newly introduced by the present disclosure, the reply to the billing request including billing information of the resources of the operator B utilized by UE101.

Figure 6:
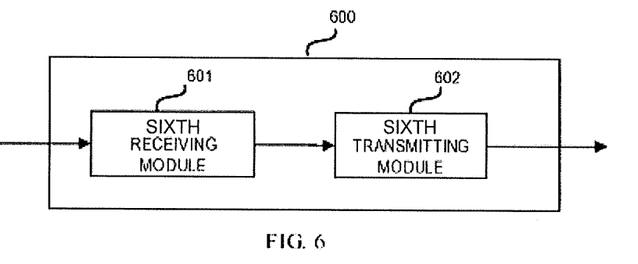
FIG. 6 illustrates a block diagram of an apparatus for obtaining resources and information of SDN networks in an SDN controller according to one embodiment of the present invention.

FIG. 6 illustrates a block diagram of an apparatus for assisting UE101 to obtain resources and information of SDN network B in the SDN controller B01 according to one embodiment of the present invention. The apparatus 600 includes: a sixth receiving module 601 and a sixth transmitting module 602.

The operational process of the apparatus will be described in details with reference to FIGS. 1 to 4.

First, the sixth receiving module 601 receives a resource request from the SDN controller A01 via the interface newly introduced by the present disclosure, the resource request including information related the resources requested by the UE101. In some embodiments, the resource request can include one or more of the following information items:
- an identification of the UE101;
- a type of resources requested by the UE101, and the type can be audio, video, pictures, fax and the like;
- a bandwidth of resources requested by the UE101;
- time limit of usage requested by the UE101, which indicates the time for using the resources;
- charges acceptable for the UE101;
- whether the SDN controller of the network B is available, namely, whether the SDN controller of the network B supports the method of the present disclosure;
- whether the network B is available;
- the time period for using the network B;
- congestion status of the network B;
- routing information of the network B, namely, the routing information of the network B accessed by the device in the network A;
- routing priority, namely, the priority for UE utilizing the routers of the network B; if a certain UE expects to utilize routers of the network B preferentially, it can set a higher priority.

Those skilled in the art should understand that the above listed information items are only examples and should not be interpreted as limitations. The resource request can also include other information for explaining the resources requested by UE101.

Afterwards, the sixth transmitting module 602 transmits a reply to the resource request to the SDN controller A01 via the interface newly introduced by the present disclosure, the reply to the resource request including related information of the resources that are available to be provided by the operator B, namely, what resources can be provided by the network B for the request of the UE101. In some embodiments, the reply to the resource request can include one or more of the following information items:
- an identification of UE101;
- a type of resources provided by the network B, and the type can be audio, video, pictures, fax etc.;
- a bandwidth of resources provided by the network B;
- time limit of usage of the resources provided by the network B;
- charges of the resources provided by the network B;
- connection information, such as accessing the network B from which underlying network node etc.

If the SDN controller B01 determines, based on its own network state, that the network B cannot provide resources requested by the UE101, the above reply to the resource request indicates that the network B cannot provide the resources requested by the UE101.

Those skilled in the art should understand that the above listed information items are only examples and should not be interpreted as limitations. The reply to the resource request sent to the SDN controller A01 by the SDN controller B01 can also include other related information for explaining the resources that are available to be provided by the operator B.

In some embodiments, the apparatus 600 also includes: a seventh receiving module (not shown in FIG. 6) and a resources release module (not shown in FIG. 6).

The seventh receiving module receives a request for releasing resources from the SDN controller A01 via the interface newly introduced by the present disclosure, the request for releasing resources including related information of the resources of the operator B requested by the UE101 for release.

Afterwards, the resources release device will release corresponding resources in the network B based on the above related information.

In some other embodiments, the apparatus 600 also includes: an eighth transmitting module (not shown in FIG. 6) and an eighth receiving module (not shown in FIG. 6).

The eighth transmitting module transmits a billing request to the SDN controller A01 via the interface newly introduced by the present disclosure, where the billing request includes information related to the resources of the operator B utilized by UE101, the information being used for indicating which resources of the operator B are utilized by UE101. In some embodiments, the billing request can include one or more of the following information items:
- an identification of UE101;
- a type of resources utilized by the UE101, and the type can be audio, video, pictures, fax etc.;
- amount of resources utilized by the UE101 (such as traffic volume etc.);
- time limit for UE101 to utilize the resources, which indicates the time for using the resources;
- charges of the resources utilized by the UE101.

Those skilled in the art can understand that the above listed information items are only examples and should not be interpreted as limitations. The billing request sent by the SDN controller B01 to the SDN controller A01 can also include other related information for explaining the resources of the operator B utilized by UE101.

Next, the eighth receiving module receives a reply to billing request from the SDN controller A01 via the interface newly introduced by the present disclosure, where the billing request reply includes billing information of the resources of the operator B utilized by the UE101.

Figure 7:
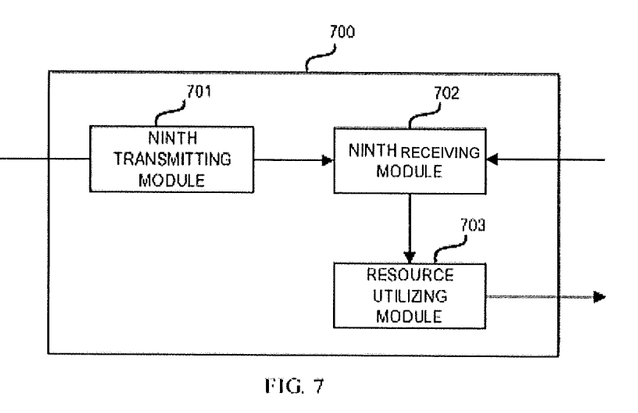
FIG. 7 illustrates a block diagram of an apparatus for obtaining resources and information of SDN networks in a UE according to one embodiment of the present invention.

FIG. 7 illustrates a block diagram of an apparatus for obtaining resources and information of the SDN network B in the UE101 according to one embodiment of the present invention. The apparatus 700 includes: a ninth transmitting module 701, a ninth receiving module 702 and a resources utilizing module 703.

First, if UE101 detects that the resources in network A cannot satisfy its needs, the ninth transmitting module 701 sends a resource request to the SDN controller A01. The scenario that the resources in network A cannot satisfy the needs of UE101 can be: insufficient resources of network A (such as network congestion and the like), or the UE101 being unable to find resources that meet its needs in network A, or the UE101 considering that charges in network A are too high.

The resource request includes information related the resources requested by the UE101, namely, the resource request specifies what kind of resources is desired by the UE101. In some embodiments, the resource request can include one or more of the following information items:
- an identification of the UE101;
- a type of resources requested by the UE101, and the type can be audio, video, pictures, fax and the like;
- a bandwidth of resources requested by the UE101;
- time limit of usage requested by the UE101, which indicates the time for using the resources;
- charges acceptable for the UE101.

Those skilled in the art would understand that the above listed information items are only examples and should not be interpreted as limitations. The resource request sent to the SDN controller A01 by the UE101 can also include other information for explaining the resources requested by the UE101.

Afterwards, the ninth receiving module 702 receives a reply to the resource request from the SDN controller A01, which includes information related to the resources that are available to be provided by the operator B.

Then, the resources utilizing module 703 utilizes corresponding resources of the operator B based on the related information of the resources that are available to be provided by the operator B. For example, if the above related information indicates that the operator B can provide the video resources requested by the UE101 and specifies IP addresses of connecting network elements, the resources utilizing module 703 can connect via the IP address to the network B, such that UE101 can utilize resources of the network B.

Generally speaking, various example embodiments of the present disclosure can be implemented in hardware, dedicated circuits, software, logic or any combinations thereof. Some aspect can be implemented in hardware while other aspects can be implemented in firmware or software executed by controllers, microprocessors or other computing devices. When each aspect of embodiments of the present disclosure is illustrated or described as a block diagram and flowchart or represented by some other graphics, it should be understood that the block, apparatus, system, technology or method described here can be implemented in hardware, software, firmware, dedicated circuits, logic, general-purpose hardware, controller, or other computing devices, or any other combinations thereof as non-restrictive examples.

As an example, embodiments of the present disclosure can be described in the context of machine-executable instructions, which is included in program modules executed in devices on a target physical or virtual processor for example. In general, program modules include routines, programs, libraries, objects, classes, components, data architecture etc. and execute particular tasks or implement a particular abstract data structures. In each embodiment, functions of the program module can be merged or divided between the described program modules and the machine-executable instructions for program modules can be executed in local or distributed devices. In the distributed devices, program modules can be positioned in local and remote storage media.

The computer program codes for implementing the method of the present disclosure can be written in one of more kinds of programming languages. The computer program codes can be provided to processors of a general-purpose computer, dedicated computer or other programmable data processing apparatuses, such that the program codes, when executed by the computer or other programmable data processing apparatuses, cause the implementation of functions/operations specified in the flowchart and/or block diagram. The program codes can be executed entirely on the computer, partially on the computer, as an independent software package, partially on the computer and partially on the remote computer or entirely on the remote computer or server.

In the context of the present disclosure, a machine-readable medium can be any tangible medium that includes or stores programs for or related to an instruction executing the system, apparatus or device. The machine-readable medium can be a machine-readable signal medium or machine-readable storage medium and can include but is not limited to an electronic, magnetic, optical, electromagnetic, infrared semiconductor system, apparatus or device, or any suitable combinations thereof. The more specific examples of the machine-readable storage medium include an electrical connection including one or more wires, a portable computer disk, a hard disk, a random-access memory (RAM), a read-only memory (ROM), an erasable programmable read-only memory (EPROM or flash), an optical storage device, a magnetic storage device, or any suitable combinations thereof.

Furthermore, although the operations are depicted in a particular order, it should be appreciated that the operations are not required to be completed in the particular order or in succession, or not all operations shown in the drawings need to be executed to obtain the expected result. In some cases, multitasking or multiprocessing is also beneficial. Likewise, although the above discussion includes some particular implementation details, they should not be interpreted as limiting the scope of the invention or claims. On the contrary, they should be appreciated as description for particular embodiments of the particular invention. Some features described separately in the context of the embodiments of the description can also be integrated and implemented in a single embodiment. Conversely, all kinds of features described in the context of a single embodiment can also be separately implemented in multiple embodiments or any suitable sub-combinations.

Although the subject matter has been described in languages specific to structural features and/or method actions, it should be understood that the subject matter defined in the attached claims is not limited to the above described particular features or actions. On the contrary, the above described specific features and actions are disclosed for implementing examples of the claims.

We claim:

1. A method implemented in an SDN a controller of a first operator for assisting a user equipment in obtaining resources and information from a second operator, comprising:

receiving, from a first user equipment, a resource request including information related to resources that are requested by the first user equipment, the first user equipment belonging to the first operator;

transmitting, to a controller of the second operator, the resource request including the information related to the resources that are requested by the first user equipment;

receiving, from the controller of the second operator, a reply to the resource request including information related to resources that are available to be provided by the second operator;

transmitting, to the first user equipment, the reply to the resource request including the information related to the resources that are available to be provided by the second operator;

in response to the information related to the resources that are available to be provided by the second operator indicating a period of validity for the resources that are available to be provided, storing, within the period of validity, the information related to the resources that are available to be provided by the second operator; and in response to receiving, within the period of validity, a resource request from a second user equipment belonging to the first operator and the resource request including information related to resources that are requested by the second user equipment, transmitting, to the second user equipment, a reply to the resource request if the resources requested by the second user equipment are determined according to a predefined rule as being similar to the resources requested by the first user equipment, the reply to the resource request including the stored information related to the resources that are available to be provided by the second operator.

2. The method of claim 1, wherein the method further comprises:
receiving, from the first user equipment, a request for resources release, the request for resources release including information related to resources of the second operator that are requested by the first user equipment for release, the first user equipment belonging to the first operator; and
transmitting, to the controller of the second operator, the request for resources release including the information related to the resources of the second operator that are requested by the first user equipment for release.

3. The method of claim 1, wherein the method further comprises:
receiving, from the controller of the second operator, a billing request including information related to resources of the second operator that are utilized by the first user equipment;
transmitting, to billing circuitry of the first operator, the billing request including the information related to the resources of the second operator that are utilized by the first user equipment;
receiving, from the billing circuitry of the first operator, a reply to the billing request including billing information for the resources of the second operator that are utilized by the first user equipment; and
transmitting, to the controller of the second operator, the reply to the billing request including the billing information for the resources of the second operator that are utilized by the first user equipment.

4. A method implemented in a controller of a second operator for assisting a first user equipment in obtaining resources and information from the second operator, the first user equipment belonging to a first operator, the method comprising:
receiving, from a controller of the first operator, a resource request including information related to resources that are requested by the first user equipment; and
transmitting, to the controller of the first operator, a reply to the resource request including information related to resources that are available to be provided by the second operator;
wherein the resource request is received from the first user equipment with the controller of the first operator, the resource request including information related to resources that are requested by the first user equipment;
wherein the reply to the resource request including the information related to the resources that are available to be provided by the second operator is transmitted from the controller of the first operator to the first user equipment;
wherein, when the information related to the resources that are available to be provided by the second operator indicate a period of validity for the resources that are available to be provided, the information related to the resources that are available to be provided by the second operator are stored with the first operator within the period of validity; and
wherein, when a resource request from a second user equipment belonging to the first operator is received with the first operator within the period of validity and the resource request includes information related to resources that are requested by the second user equipment, a reply to the resource request is transmitted to the second user equipment if the resources requested by the second user equipment are determined according to a predefined rule as being similar to the resources requested by the first user equipment, the reply to the resource request to the second user equipment including the stored information related to the resources that are available to be provided by the second operator.

5. The method of claim 4, wherein the method further comprises:
receiving, from the controller of the first operator, a request for resources release, the request for resources release including information related to resources of the second operator that are requested by the user equipment for release; and
releasing corresponding resources based on the related information.

6. The method of claim 4, wherein the method further comprises:
transmitting, to the controller of the first operator, a billing request including information related to resources of the second operator that are utilized by the user equipment; and
receiving, from the controller of the first operator, a reply to the billing request including billing information for the resources of the second operator that are utilized by the user equipment.

7. A method implemented in a user equipment of a first operator for obtaining resources and information of a second operator, comprising:
transmitting, to a controller of the first operator, a resource request including information related to resources that are requested by a first user equipment, the first user equipment belonging to the first operator;
receiving, from the controller of the first operator, a reply to the resource request including information related to resources that are available to be provided by the second operator; and
utilizing resources of the second operator based on the information related to the resources that are available to be provided by the second operator;
wherein the resource request including the information related to the resources that are requested by the first user equipment is transmitted to a controller of the second operator;
wherein a reply to the resource request including information related to resources that are available to be provided by the second operator is received with the controller of the first operator from the controller of the second operator;
wherein, when the information related to the resources that are available to be provided by the second operator indicate a period of validity for the resources that are available to be provided, the information related to the resources that are available to be provided by the second operator are stored with the first operator within the period of validity; and
wherein, when a resource request from a second user equipment belonging to the first operator is received with the first operator within the period of validity and the resource request includes information related to resources that are requested by the second user equipment, a reply to the resource request is transmitted to the second user equipment if the resources requested by the second user equipment are determined according to a predefined rule as being similar to the resources requested by the first user equipment, the reply to the resource request to the second user equipment including the stored information related to the resources that are available to be provided by the second operator.

8. An apparatus in a controller of a first operator for assisting a user equipment in obtaining resources and information from a second operator, comprising:

first receiving circuitry configured to receive, from a first user equipment, a resource request including information related to resources that are requested by the first user equipment, the first user equipment belonging to the first operator;

first transmitting circuitry configured to transmit, to a controller of the second operator, the resource request including the information related to the resources that are requested by the first user equipment;

second receiving circuitry configured to receive, from the controller of the second operator, a reply to the resource request including information related to resources that are available to be provided by the second operator;

second transmitting circuitry configured to transmit, to the first user equipment, the reply to the resource request including the information related to the resources that are available to be provided by the second operator;

storing circuitry configured to store, within the period of validity, the information related to the resources that are available to be provided by the second operator, in response to the information related to the resources that are available to be provided by the second operator indicating a period of validity for the resources that are available to be provided; and wherein in response to receiving, within the period of validity, a resource request from a second user equipment belonging to the first operator and the resource request including information related to resources that are requested by the second user equipment, the second transmitting circuitry is configured to transmit, to the second user equipment, a reply to the resource request if the resources requested by the second user equipment are determined according to a predefined rule as being similar to the resources requested by the first user equipment, the reply to the resource request including the stored information related to the resources that are available to be provided by the second operator.

9. The apparatus of claim 8, wherein the apparatus further comprises:

third receiving circuitry configured to receive, from the first user equipment, a request for releasing resources, the request for resources release including information related to the resources of a second operator that are requested by the first user equipment for release, the first user equipment belonging to the first operator; and third transmitting circuitry configured to transmit, to the controller of the second operator, the request for resources release, the request for resources release including information related to the resources of the second operator that are requested by the first user equipment for release.

10. The apparatus of claim 8, wherein the apparatus further comprises:

fourth receiving circuitry configured to receive, from the controller of the second operator, a billing request, the billing request including information related to resources of the second operator that are utilized by the first user equipment;

fourth transmitting circuitry configured to transmit, to billing circuitry of the first operator, the billing request, the billing request including the information related to resources of the second operator that are utilized by the first user equipment;

fifth receiving circuitry configured to receive, from the billing circuitry of the first operator, a reply to the billing request, the reply to the billing request including billing information for the resources of the second operator that are utilized by the first user equipment; and fifth transmitting circuitry configured to transmit, to the controller of the second operator, the reply to the billing request, the reply to the billing request including billing information for the resources of the second operator that are utilized by the first user equipment.

11. An apparatus in a controller of a second operator for assisting a first user equipment to obtain resources and information from the second operator, the first user equipment belonging to a first operator, and the apparatus comprises:

sixth receiving circuitry configured to receive, from a controller of the first operator, a resource request, the resource request including information related to resources requested by the first user equipment; and sixth transmitting circuitry configured to transmit, to the controller of the first operator, a reply to the resource request, the reply to the resource request including information related to resources that are available to be provided by the second operator;

wherein the resource request is received from the first user equipment with the controller of the first operator, the resource request including information related to resources that are requested by the first user equipment;

wherein the reply to the resource request including the information related to the resources that are available to be provided by the second operator is transmitted from the controller of the first operator to the first user equipment;

wherein, when the information related to the resources that are available to be provided by the second operator indicate a period of validity for the resources that are available to be provided, the information related to the resources that are available to be provided by the second operator are stored with the first operator within the period of validity, and wherein, when a resource request from a second user equipment belonging to the first operator is received with the first operator within the period of validity and the resource request includes information related to resources that are requested by the second user equipment, a reply to the resource request is transmitted to the second user equipment if the resources requested by the second user equipment are determined according to a predefined rule as being similar to the resources requested by the first user equipment, the reply to the resource request to the second user equipment including the stored information related to the resources that are available to be provided by the second operator.

12. The apparatus of claim 11, wherein the apparatus also comprises:

seventh receiving circuitry configured to receive, from the controller of the first operator, a request for resources release, the request for resources release including information related to resources of the second operator that are requested by the user equipment for release;

resources release circuitry configured to release corresponding resources based on the related information.

13. The apparatus of claim 11, wherein the apparatus also comprises:
   eighth transmitting circuitry configured to transmit, to the controller of the first operator, a billing request, the billing request including information related to the resources of the second operator that are utilized by the user equipment; and
   eighth receiving circuitry configured to receive, from the controller of the first operator, a reply to the billing request, the reply to the billing request including billing information for the resources of the second operator that are utilized by the user equipment.

14. An apparatus for obtaining resources and information of a second operator, comprising:
   ninth transmitting circuitry configured to transmit, to a controller of the first operator, a resource request, the resource request including information related to resources that are requested by a first user equipment, the first user equipment belonging to the first operator;
   ninth receiving circuitry configured to receive, from the controller of the first operator, a reply to the resource request, the reply to the resource request including information related to resources that are available to be provided by the second operator;
   resources utilizing circuitry configured to utilize resources of the second operator based on related information of resources that are available to be provided by the second operator;
   wherein the resource request including the information related to the resources that are requested by the first user equipment is transmitted to a controller of the second operator;
   wherein a reply to the resource request including information related to resources that are available to be provided by the second operator is received with the controller of the first operator from the controller of the second operator;
   wherein, when the information related to the resources that are available to be provided by the second operator indicate a period of validity for the resources that are available to be provided, the information related to the resources that are available to be provided by the second operator are stored with the first operator within the period of validity; and
   wherein, when a resource request from a second user equipment belonging to the first operator is received with the first operator within the period of validity and the resource request includes information related to resources that are requested by the second user equipment, a reply to the resource request is transmitted to the second user equipment if the resources requested by the second user equipment are determined according to a predefined rule as being similar to the resources requested by the first user equipment, the reply to the resource request to the second user equipment including the stored information related to the resources that are available to be provided by the second operator.

* * * * *

UNITED STATES PATENT AND TRADEMARK OFFICE
CERTIFICATE OF CORRECTION

PATENT NO.        : 10,805,838 B2
APPLICATION NO.   : 16/348539
DATED             : October 13, 2020
INVENTOR(S)       : Xin Qu and Yigang Cai Page 1 of 1

It is certified that error appears in the above-identified patent and that said Letters Patent is hereby corrected as shown below:

In the Claims

Claim 1:
Column 16, Line 33, "an SDN" should be deleted.

Signed and Sealed this
Seventeenth Day of November, 2020

Andrei Iancu
*Director of the United States Patent and Trademark Office*